(12) United States Patent
Nagahara

(10) Patent No.: US 11,537,334 B2
(45) Date of Patent: Dec. 27, 2022

(54) PRINTING APPARATUS AND COLOR CHART PRINTING COLORIMETRY METHOD

(71) Applicant: SEIKO EPSON CORPORATION, Tokyo (JP)

(72) Inventor: Atsushi Nagahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/452,442

(22) Filed: Oct. 27, 2021

(65) Prior Publication Data

US 2022/0137888 A1    May 5, 2022

(30) Foreign Application Priority Data

Oct. 30, 2020 (JP) .............................. JP2020-182878

(51) Int. Cl.
*H04N 1/60* (2006.01)
*G06F 3/12* (2006.01)
*H04N 1/50* (2006.01)
*G01N 21/25* (2006.01)

(52) U.S. Cl.
CPC ......... *G06F 3/1208* (2013.01); *G01N 21/251* (2013.01); *G06F 3/1253* (2013.01); *H04N 1/50* (2013.01); *H04N 1/603* (2013.01)

(58) Field of Classification Search
CPC ..... G06F 3/1208; H04N 1/603; H04N 1/6041
See application file for complete search history.

(56) References Cited

U.S. PATENT DOCUMENTS

| 2003/0200888 A1* | 10/2003 | Fukui | ................. | B41F 33/0081 |
| | | | | 101/484 |
| 2004/0032602 A1* | 2/2004 | Teraue | ................. | H04N 1/6011 |
| | | | | 358/1.9 |
| 2004/0177784 A1* | 9/2004 | Yamamoto | .......... | B41F 33/0045 |
| | | | | 101/484 |
| 2005/0168761 A1* | 8/2005 | Yoshikawa | .......... | H04N 1/6052 |
| | | | | 358/1.9 |
| 2006/0285181 A1* | 12/2006 | Fukui | ................. | B41F 33/0045 |
| | | | | 358/504 |

(Continued)

FOREIGN PATENT DOCUMENTS

| CN | 101531102 B | * | 8/2011 | .............. | B41J 29/02 |
| JP | 2010-240996 A | | 10/2010 | | |

(Continued)

*Primary Examiner* — Ted W Barnes
(74) *Attorney, Agent, or Firm* — Workman Nydegger

(57) ABSTRACT

A printing apparatus includes a printing unit, a colorimetry unit, a data generation unit configured to generate color chart data, and a printing colorimetry control unit configured to control printing performed by the printing unit and colorimetry performed by the colorimetry unit, where the data generation unit acquires, from a first image represented by a first print job, a position of a first spot color contained in the first image and generates the color chart data having the first spot color patch disposed at a position corresponding to a position of the first spot color in the first image, and the printing colorimetry control unit causes the printing unit to print the color chart that is based on the color chart data and causes the colorimetry unit to measure the color of the color chart printed on the printing medium by the printing unit.

8 Claims, 12 Drawing Sheets

(56) References Cited

U.S. PATENT DOCUMENTS

| | | | | |
|---|---|---|---|---|
| 2012/0120424 A1* | 5/2012 | Hirano | ............... | H04N 1/62 |
| | | | | 358/1.9 |
| 2012/0274958 A1* | 11/2012 | Hoshino | ............ | H04N 1/603 |
| | | | | 358/1.9 |
| 2014/0198326 A1* | 7/2014 | Yamamuro | ......... | H04N 1/6044 |
| | | | | 358/1.9 |
| 2014/0198327 A1* | 7/2014 | Yamamuro | ......... | H04N 1/6036 |
| | | | | 358/1.9 |
| 2020/0298586 A1 | 9/2020 | Arazaki | | |

FOREIGN PATENT DOCUMENTS

| | | | | |
|---|---|---|---|---|
| JP | 2020-152082 A | | 9/2020 | |
| JP | 2020-160655 A | | 10/2020 | |
| JP | 2020160655 A | * | 10/2020 | |
| JP | 2021138051 A | * | 9/2021 | |
| WO | WO-2006101811 A1 | * | 9/2006 | ......... H04N 1/40006 |

* cited by examiner

27

| TYPE OF PRINTING MEDIUM | RECORDING METHOD (NUMBER OF PASSES) | ICC PROFILE |
|---|---|---|
| CP01 | 4 | CP01_4pass.icc |
| CP01 | 6 | CP01_6pass.icc |
| CP02 | 4 | CP02_4pass.icc |
| CP02 | 6 | CP02_6pass.icc |
| CP02 | 8 | CP02_8pass.icc |

| PRIORITY ORDER | SPOT COLOR NAME | TINT VALUE | | |
|---|---|---|---|---|
| | | L | a | b |
| 1 | R100 | 60 | 64 | 35 |
| 2 | B100 | 33 | 25 | −60 |
| 3 | Y100 | 90 | −2 | 90 |
| 4 | O100 | 85 | 40 | 67 |
| 5 | G100 | 72 | −63 | 57 |

| SPOT COLOR NAME | INK QUANTITY | | | |
|---|---|---|---|---|
| | C | M | Y | K |
| R100 | 0 | 81 | 55 | 0 |
| B100 | 86 | 78 | 0 | 0 |
| Y100 | 2 | 10 | 88 | 0 |
| O100 | 0 | 49 | 60 | 0 |
| G100 | 67 | 0 | 90 | 0 |

FIG. 6

| PATCH POSITION | SPOT COLOR SURFACE AREA ||||| 
|---|---|---|---|---|---|
| | R100 | B100 | Y100 | O100 | G100 |
| PATCH POSITION 41a | 0 | 0 | 300 | 1500 | 3000 |
| PATCH POSITION 41b | 0 | 600 | 1980 | 0 | 0 |
| PATCH POSITION 41c | 0 | 2260 | 4520 | 0 | 0 |
| PATCH POSITION 41d | 480 | 1780 | 4015 | 0 | 0 |
| PATCH POSITION 41e | 0 | 2260 | 4520 | 0 | 0 |

FIG. 10

PRINTING APPARATUS AND COLOR CHART PRINTING COLORIMETRY METHOD

The present application is based on, and claims priority from JP Application Serial Number 2020-182878, filed Oct. 30, 2020, the disclosure of which is hereby incorporated by reference herein in its entirety.

BACKGROUND

1. Technical Field

The present disclosure relates to a printing apparatus and a color chart printing colorimetry method.

2. Related Art

An image represented by a print job may contain a color called a "spot color." A spot color is a prescribed color that a user particularly desires to be reproduced with a high degree of accuracy on a printing medium. Therefore, by printing a spot color patch, which is a patch of the spot color, on the printing medium and measuring the color of the patch, the tone of the spot color in the printing result may be evaluated.

As an example of related art, a printer has been disclosed that measures the color of a test pattern printed on a sheet using a colorimeter mounted downstream of the sheet in a transport direction to acquire a colorimetry value for the test pattern (see JP-A-2010-240996).

However, the tone in the printing result of the spot color contained in the image may differ due to a position where the spot color is printed. This is because if the printing position differs, subtle differences in various conditions affecting the printing result may appear, such as a different drying time of a color material such as ink, a different amount of discharged ink depending on the nozzle used in printing, and the like. Therefore, the color of the spot color patch printed on the printing medium may differ from the color of the spot color when the print job was printed on the printing medium, and adequately evaluating a spot color based on a colorimetry value of a spot color patch has been difficult.

SUMMARY

A printing apparatus includes a printing unit configured to perform printing by attaching a color material to a printing medium, a colorimetry unit configured to measure a color, a data generation unit configured to generate color chart data for printing a color chart that includes a first spot color patch that is a patch of a first spot color, and a printing colorimetry control unit configured to control printing performed by the printing unit and colorimetry performed by the colorimetry unit, where the data generation unit acquires, from a first image represented by a first print job, a position of the first spot color contained in the first image and generates the color chart data having the first spot color patch disposed at a position corresponding to a position of the first spot color in the first image, and the printing colorimetry control unit causes the printing unit to print the color chart that is based on the color chart data and causes the colorimetry unit to measure the color of the color chart printed on the printing medium by the printing unit.

A color chart printing colorimetry method includes data generation step for generating color chart data for printing a color chart that includes a first spot color patch that is a patch of a first spot color, a printing step, and a colorimetry step, where the data generation step includes acquiring, from a first image represented by a first print job, a position of the first spot color contained in the first image and generating the color chart data having the first spot color patch disposed at a position corresponding to a position of the first spot color in the first image, the printing step includes causing a printing unit to print on a printing medium the color chart that is based on the color chart data, and the colorimetry step includes causing a colorimetry unit to measure the color of the color chart printed on the printing medium by the printing unit.

BRIEF DESCRIPTION OF THE DRAWINGS

FIG. 4 is a diagram illustrating an exemplary ICC profile database.

FIG. 5 is a diagram illustrating an exemplary spot color database.

FIG. 6 is a diagram illustrating an exemplary ink quantity table acquired in step S120.

FIG. 10 is a diagram illustrating a correspondence relationship between a patch position and the surface area of a spot color.

DESCRIPTION OF EXEMPLARY EMBODIMENTS

Embodiments of the present disclosure will be described below with reference to the accompanying drawings. Note that each of the drawings is merely illustrative for describing the embodiment. Since the drawings are illustrative, proportions and shapes may not be precise, match each other, or some may be omitted.

1. Apparatus Configuration

Figure 1:
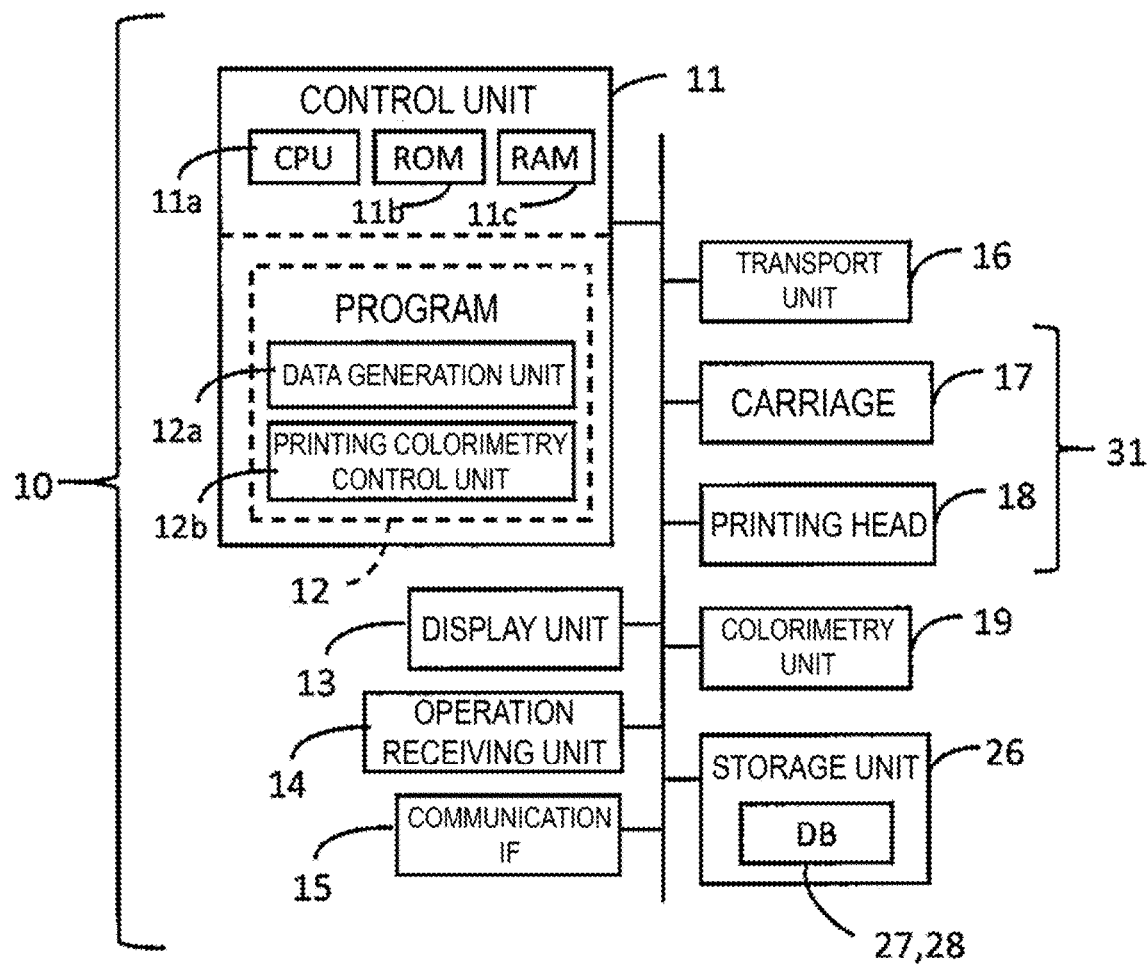
FIG. 1 is a block diagram illustrating a device configuration in a simplified manner.

FIG. 1 illustrates a configuration of a printing apparatus 10 according to the embodiment, in a simplified manner.

The printing apparatus 10 is provided with a control unit 11, a display unit 13, an operation receiving unit 14, a communication IF 15, a transport unit 16, a carriage 17, a printing head 18, a colorimetry unit 19, a storage unit 26, and the like. IF is an abbreviation for interface. The control unit 11 is configured to include, as a processor, one or more ICs including a CPU 11a, a ROM 11b, a RAM 11c, and the like, another non-volatile memory, and the like.

In the control unit 11, the processor, that is, the CPU 11a executes arithmetic processing in accordance with one or more programs 12 stored in the ROM 11b, another memory, or the like, using the RAM 11c or the like as a work area, to function as a data generation unit 12a, a printing colorimetry control unit 12b, and the like. The program 12 is also called a printing colorimetry control program, and the like. Note that the processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a device for displaying visual information, and is configured, for example, by a liquid crystal display, an organic EL display, or the like. The display unit 13 may be configured to include a display and a drive circuit for driving the display. The operation receiving unit 14 is a device for receiving an operation by a user, and is realized, for example, by a physical button, a touch panel, a mouse, a keyboard, or the like. Of course, the touch panel may be realized as a function of the display unit 13.

The display unit 13 and the operation receiving unit 14 may be part of the configuration of the printing apparatus 10, or may be peripheral devices externally coupled to the printing apparatus 10. The communication IF 15 is a generic term for one or a plurality of IFs for coupling the printing apparatus 10 with the outside in a wired or wireless manner, in accordance with a prescribed communication protocol including a known communication standard provide.

The transport unit 16 is a device for transporting a printing medium in a "first direction," and includes a roller, a belt, and a motor for rotating the roller and the like. The first direction is also called a transport direction.

The printing head 18 uses an inkjet method to eject ink as a color material onto the printing medium to print.

The colorimetry unit 19 is a unit for measuring the color of a target. The format of a colorimetric value generated and output by the colorimetry unit 19 as colorimetry results may, for example, be L*a*b* values in the L*a*b* color space defined by the International Commission on Illumination (CIE) or an RGB value that combines hue values for each of red (R), green (G), and blue (B). In the following, the colorimetric values obtained by the colorimetry unit 19 are given as L*a*b* values. In addition, the "*" notation is omitted.

The printing head 18 is mounted on the carriage 17. The carriage 17 is a mechanism capable of reciprocating along a primary scanning direction of the printing head 18 as a result of receiving power from a motor (not illustrated). The configuration that includes the carriage 17 and the printing head 18 corresponds to the printing unit 31. The transport unit 16 may also be considered part of the printing unit 31.

The configuration of the printing apparatus 10 illustrated in FIG. 1 may be realized by a single printer, or may be realized by a plurality of communicatively coupled devices.

In other words, the printing apparatus 10 may be the printing system 10 in actuality. The printing system 10 includes, for example, an information processing device that functions as the control unit 11, and a printer including the transport unit 16, the carriage 17, the printing head 18, and the colorimetry unit 19. A printing colorimetry method for a color chart is realized using the printing apparatus 10 or the printing system 10.

Figure 2:
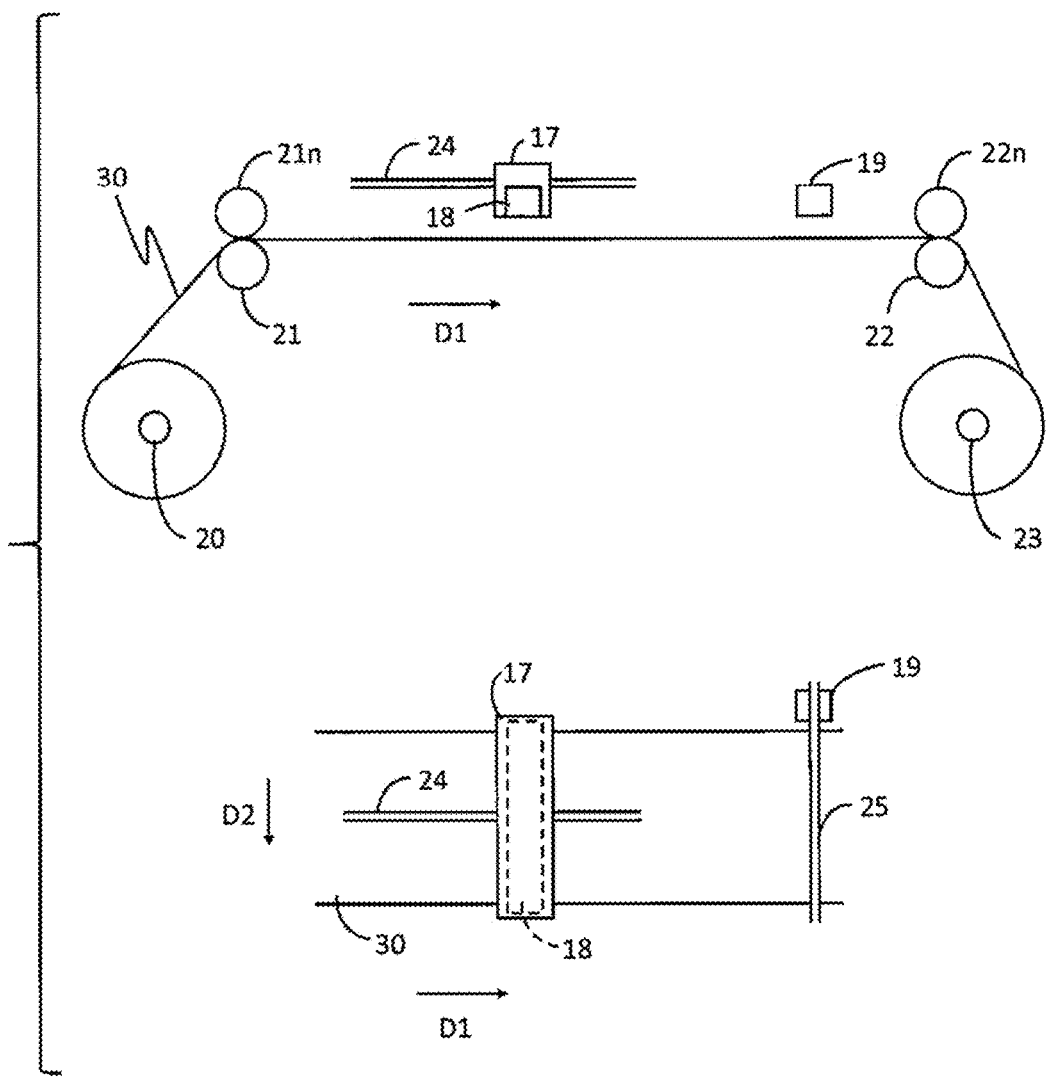
FIG. 2 is a diagram illustrating a specific example of a configuration that includes a transport unit and a carriage.

FIG. 2 illustrates a specific example of a configuration that includes the transport unit 16 and the carriage 17. In the top section of FIG. 2, the specific example is illustrated using a perspective orthogonal to a first direction D1. In the bottom section of FIG. 2, a portion of the specific example is illustrated using a perspective from above.

According to FIG. 2, the transport unit 16 is provided with a feeding shaft 20 upstream in the transport and a winding shaft 23 downstream in the transport. Upstream and downstream in the transport are denoted simply using "upstream" and "downstream." A long printing medium 30 wound in a roll shape around the feeding shaft 20 and the winding shaft 23 is stretched along the first direction D1. The printing medium 30 is transported in the first direction D1. The printing medium 30 may be a paper sheet or may be a medium made from a material other than paper. In addition, the printing medium 30 may be a medium having a two-layered structure configured by a sheet called a label or seal and a mount to which the sheet is adhered by an adhesive.

In the example illustrated in the top section of FIG. 2, the printing medium 30 wound around the feeding shaft 20 is fed downstream by the feeding shaft 20 rotating in the clockwise direction. A front driving roller 21 is provided at a position downstream of the feeding shaft 20, and a rear driving roller 22 is provided at a position upstream of the winding shaft 23. By rotating in the clockwise direction, the front driving roller 21 transports downstream the printing medium 30 fed out from the feeding unit 20. A nip roller 21n is provided to the front driving roller 21. The nip roller 21n comes into contact with the printing medium 30, clamping the printing medium 30 between the nip roller 21n and the front driving roller 21.

By rotating in the clockwise direction, the rear driving roller 22 transports further downstream the printing medium 30 transported downstream by the front driving roller 21. A nip roller 22n is provided to the rear driving roller 22. The nip roller 22n comes into contact with the printing medium 30, clamping the printing medium 30 between the nip roller 22n and the rear driving roller 22.

The printing head 18 that discharges ink onto the printing medium 30 from above is disposed between the front driving roller 21 and the rear driving roller 22. As illustrated in FIG. 2, the printing head 18 is mounted on the carriage 17. The printing head 18 is capable of discharging a plurality of colors of ink, such as cyan (C), magenta (M), yellow (Y), and black (K), for example.

Although not illustrated in the drawings, the printing head 18 includes a nozzle row for each of the CMYK inks. A nozzle row that corresponds to one color of ink is composed of a plurality of nozzles that discharge the one color of ink and have a fixed distance between nozzles (nozzle pitch) in a second direction D2. Of course, the printing head 18 is capable of discharging ink that is not limited to CMYK ink.

Each nozzle of the printing head 18 is open on a surface of the printing head 18 facing the printing medium 30, and the printing head 18 discharges or does not discharge the ink from the nozzle on the basis of print data. The ink discharged by the nozzle is also referred to as an ink droplet, or as a dot. The printing head 18 may also be referred to as a print head, an inkjet head, a liquid discharging head, and the like. As a result of the winding shaft 23 rotating in the clockwise direction, the winding shaft 23 rolls up the printing medium 30 that has been printed and transported by the rear driving roller 24.

The feeding shaft 20, the winding shaft 23, each of the rollers, the motor (not illustrated) for rotating these components as appropriate, and the like are a specific example of the transport unit 16. A number and arrangement of the rollers provided along the transport path for transporting the printing medium 30 is not limited to the mode illustrated in FIG. 2. It goes without saying that a flat platen or the like supporting, from below, the printing medium 30 that receives the ink discharge from the printing head 18, may be provided between the front driving roller 21 and the rear driving roller 22.

As illustrated in the bottom section of FIG. 2, the "second direction D2" intersects with the first direction D1. The first direction D1 and the second direction D2 are orthogonal or substantially orthogonal to each other. In the example illustrated in FIG. 2, a guide rail 24 that is long in the first direction D1 is provided above the printing medium 30 between the front driving roller 21 and the rear driving roller 22, and the carriage 17 is capable of moving along the guide rail 24. Thus, in FIG. 2, the first direction D1 is parallel to the primary scanning direction of the printing head 18. Of course, a member supporting the carriage 17 in order to stabilize the posture of the carriage 17 is not limited to the guide rail 24.

In addition, the carriage 17 can move along the second direction D2. Although not illustrated in the drawings, a mechanism such as another guide rail may be provided to allow a unit that includes the carriage 17 and the guide rail 24 to reciprocate along the second direction D2, for example. The movement of the carriage 17 in each of the first direction D1 and the second direction D2 is controlled by the printing colorimetry control unit 12b. An operation for the printing head 18 to discharge ink in association with the carriage 17 moving along the first direction D1 is referred to as primary scanning, a pass, or the like. In addition, relative movement of the carriage 17 and the printing head 18 in the second direction D2 with respect to the printing medium 30 is referred to as sub scanning.

The printing colorimetry control unit 12b, for example, alternatingly combines a pass with sub scanning and moves the carriage 17 and the printing head 18 two-dimensionally relative to a surface of a static printing medium 30. As a result, an image based on print data is printed on the printing medium 30.

As illustrated in FIG. 2, the colorimetry unit 19 is disposed at a position downstream of the carriage 17 and the printing head 18, that is, of the printing unit 31, in the first direction D1 and upstream of the rear driving roller 22. The colorimetry unit 19 is capable of moving along a guide rail 25 that is long in the second direction D2. While moving in the second direction D2, the colorimetry unit 19 measures color on the printing medium 30 that is transported downstream by the transport unit 16 after printing is performed.

The storage unit 26 illustrated in FIG. 1 is, for example, a hard disk drive (HDD), a solid state drive (SSD), or some other memory. An ICC profile DB 27 and spot color DB 28, described hereafter, are stored in the storage unit 26. DB is an abbreviation for database. However, the ICC profile DB 27 and spot color DB 28 need not be stored in the printing apparatus 10, and may be stored in an external server or the like that the control unit 11 is capable of accessing via the communication IF 15. Regardless, the ICC profile database DB 27 and spot color DB 28 are prepared in a state that enables the control unit 11 to reference the databases.

2. Printing Colorimetry Processing of Color Chart 2-1. First Embodiment

Next, printing colorimetry processing of a color chart according to a first embodiment will be described.

Figure 3:
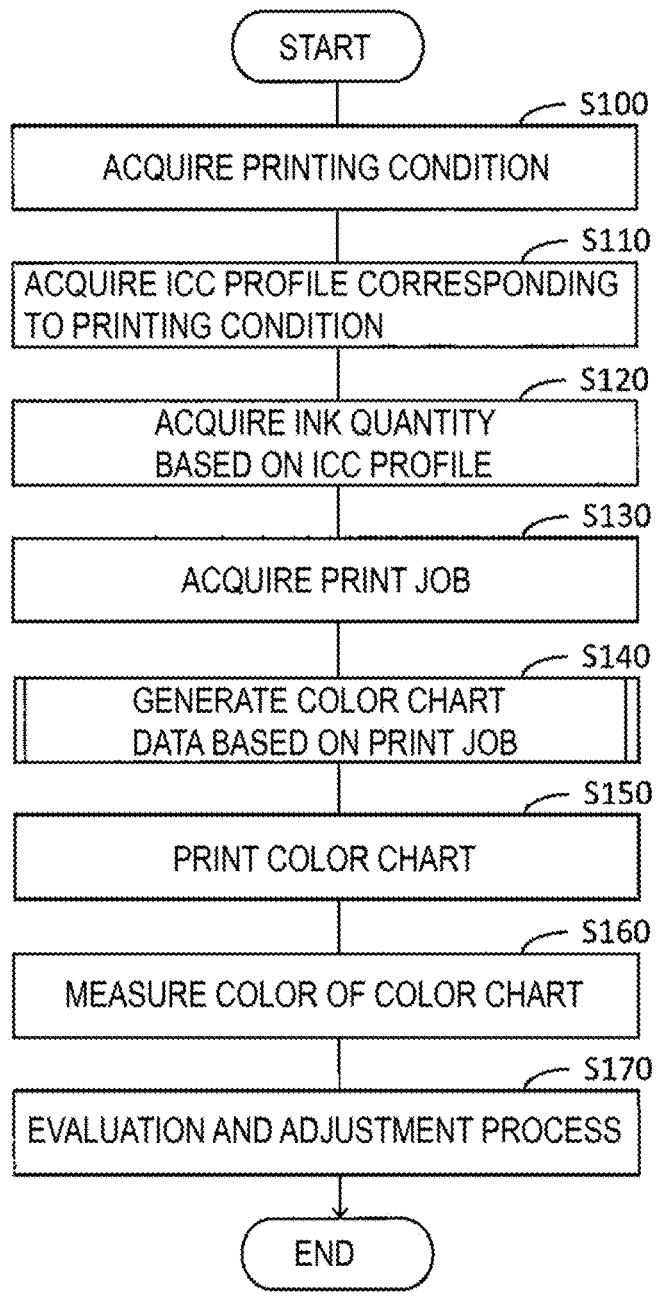
FIG. 3 is a flowchart illustrating printing colorimetry processing of a color chart.

FIG. 3 illustrates the printing colorimetry processing of a color chart using a flowchart. The printing colorimetry processing of a color chart is realized by the control unit 11 performing processing according to the program 12.

In step S100, the data generation unit 12a acquires a printing condition for an image. In other words, the data generation unit 12a acquires a printing condition specified through user operation of the operation receiving unit 14. Examples of the printing condition include information that contains the number of passes necessary for one round of printing, or the type of printing medium to be used, for example. One round of printing may also be referred to as one-frame printing.

In step S110, the data generation unit 12a references the ICC profile DB 27 and acquires the ICC profile that corresponds to the printing condition acquired in step S100.

FIG. 4 illustrates an exemplary ICC profile DB 27. In the ICC profile DB 27, ICC profiles are linked to combinations of a type of printing medium and a recording method and registered in the ICC profile DB 27. Here, "recording method" refers to the number of passes. The ICC profile specifies a correspondence relationship between Lab values and a quantity of ink for each of CMYK that is required to realize the Lab value in a printing result. The quantity of ink for each of CMYK is also called a CMYK value. Each of a C, M, Y, and K value that constitute the CMYK value are hue values expressing 256 hues from 0 to 255, for example.

With a different type of printing medium or recording method, the tone of the printing result will also differ, and therefore ICC profiles that differ according to the type of printing medium or recording mode are registered. The data generation unit 12a acquires, from the ICC profile DB 27, the ICC profile that corresponds to the type of printing medium and number of passes acquired as the printing condition in step S100. When medium type=CP01 and number of passes=4 is acquired as the printing condition, for example, the data generation unit 12a acquires, from the ICC profile DB 27, ICC profile "CP01_4 pass.icc" that corresponds to medium type=CP01 and number of passes=4.

In step S120, the data generation unit 12a acquires the ink quantity for each spot color on the basis of the spot color DB 28 and the ICC profile acquired in step S110.

FIG. 5 illustrates an exemplary spot color DB 28. The spot color DB 28 is a table specifying a priority order, a spot color name, and a tint value for a plurality of spot colors. The tint value is the Lab value. The priority order is a priority order among the spot colors, and means that the higher the position in the order, the greater the importance of the spot color. The priority order of the spot colors may also be configured to be modifiable by a user operation.

In the example in FIG. 5, information for five spot colors "R100," "B100," "Y100," "O100," and "G100" is specified in the spot color DB 28. Spot color may also be referred to as a solid color or specific color. In very simple terms, "R100" is red, "B100" is blue, "Y100" is yellow, "O100" is orange, and "G100" is green.

The data generation unit 12a converts the Lab values for each spot color specified in the spot color DB 28 into a CMYK value using the ICC profile acquired in step S110. As a result, the ink quantity corresponding to each of the spot colors "R100," "B100," "Y100," "O100," and "G100" is obtained.

FIG. 6 illustrates an exemplary ink quantity table 29 detailing the ink quantity for each of the spot colors "R100," "B100," "Y100," "O100," and "G100," acquired by the data generation unit 12a in step S120. The CMYK values in the ink quantity table 29 are ink quantities obtained by converting the Lab values of a spot color using the ICC profile "CP01_4 pass.icc."

In step S130, the data generation unit 12a acquires a print job. In other words, the data generation unit 12a inputs a print job from a prescribed storage source in accordance with an instruction received via user operation of the operation receiving unit 14. The print job includes an image file representing an image that is to be printed (hereafter, "target image") in a prescribed format, data detailing the type of spot color contained in the target image, and the like. Step S130 may be executed prior to steps S100 to S120, or may be executed in parallel with steps S100 to S120.

The printing apparatus 10 is, of course, capable of printing the target image, but printing of the target image is not discussed in detail in the present embodiment.

In step S140, the data generation unit 12a generates color chart data on the basis of the print job acquired in step S130. Step S140 corresponds to "generating data," where color chart data is generated. The print job acquired in step S130 corresponds to a "first print job," and the target image represented by the first print job corresponds to a "first image." The color chart data is print data for printing a color chart in which a "spot color patch" (a patch of a spot color) is arranged.

Figure 7:
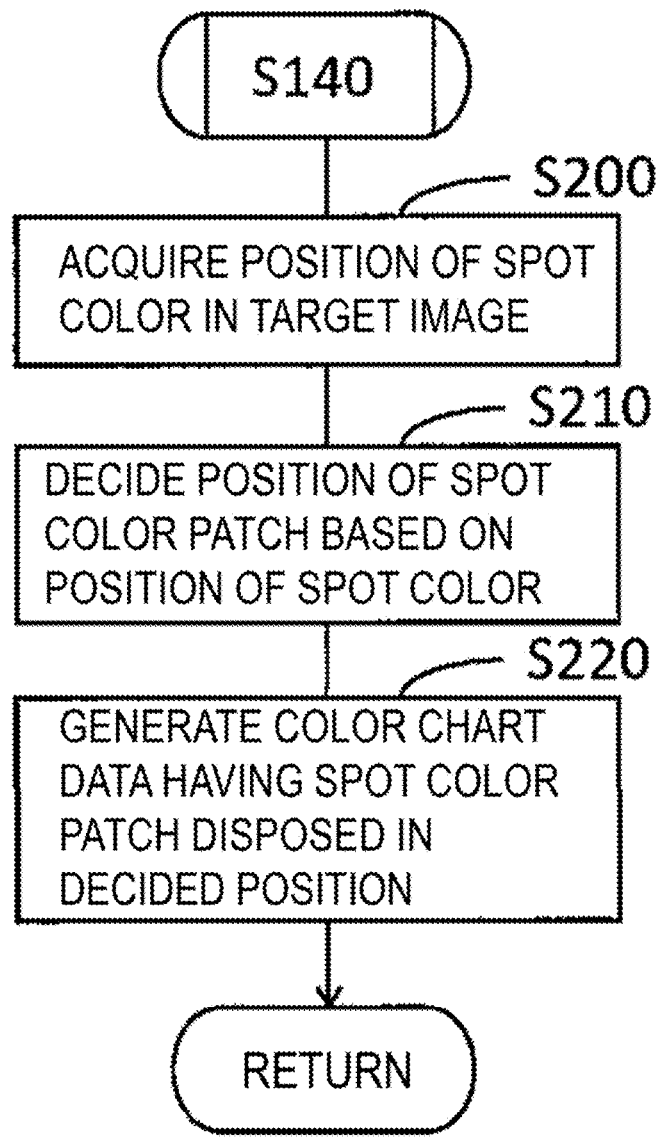
FIG. 7 is a flowchart illustrating details of step S140.

FIG. 7 is a flowchart illustrating details of step S140.

In step S200, the data generation unit 12a acquires, from the target image, a position of the spot color contained in the target image. In this case, informed by the print job, the data generation unit 12a specifies the type of spot color contained in the target image and learns the position within the target image for each of the specified types of spot color.

Figure 8:
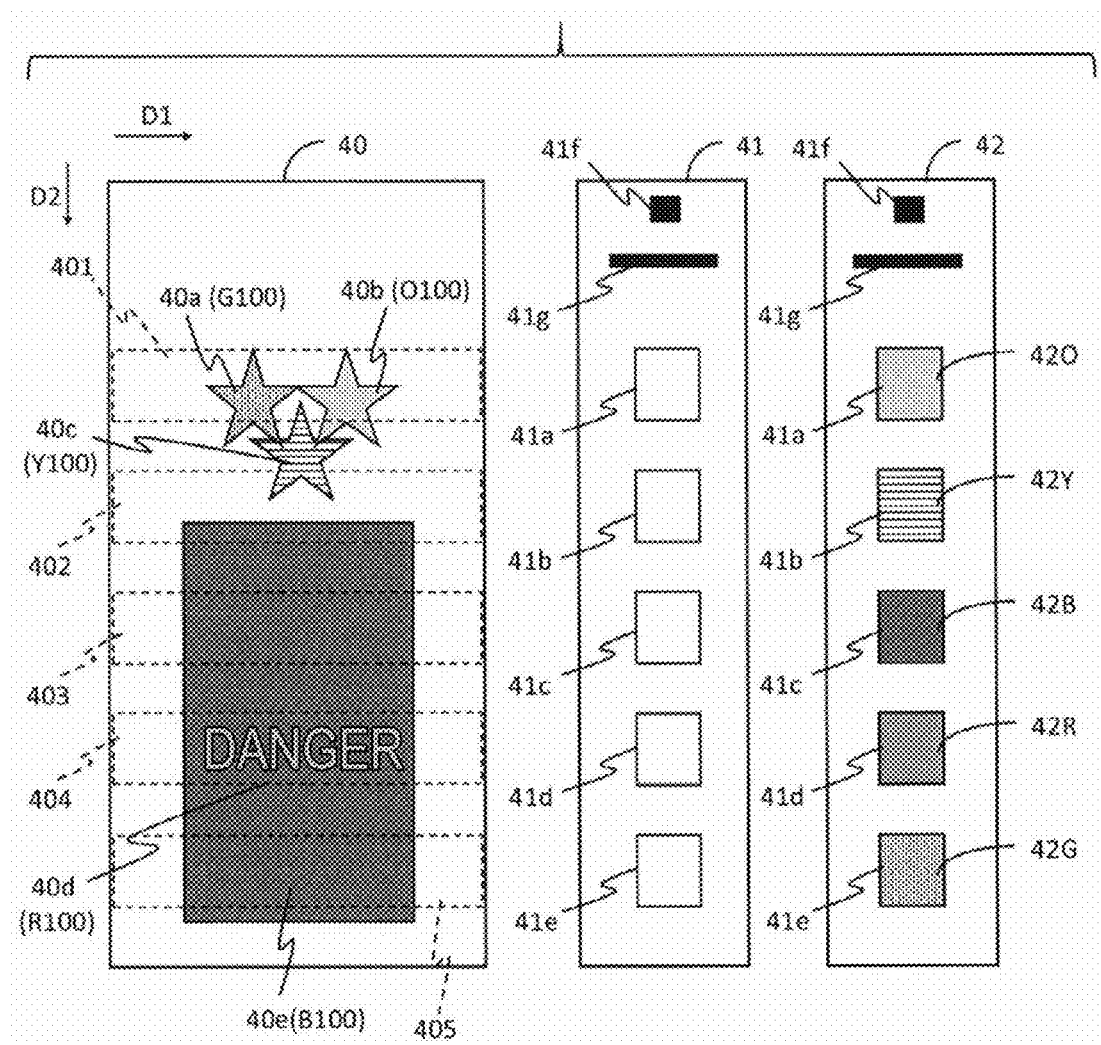
FIG. 8 is a diagram describing a specific example of steps S200 to S220 in a first embodiment.

FIG. 8 is a diagram describing a specific example of steps S200 to S220. To facilitate the description, a target image 40 represented by the print job, color chart data 42 generated in step S220, and color chart base data 41 serving as the basis for generating the color chart data 42 are depicted in a row in FIG. 8. The target image 40 is an example of the first image. In FIG. 8, the orientation of each image is described in accordance with its relationship to the first direction D1 and the second direction D2. The size of the color chart base data 41 and the color chart data 42 in the second direction D2 is equal to the size of the target image 40 in the second direction D2.

According to FIG. 8, the target image 40 contains three star images 40a, 40b, and 40c having a star shape, a character string 40d that reads "DANGER," and a rectangular image 40e serving as a background to the character string 40d. According to the print job, the target image 40 is treated as containing all of the spot colors "R100," "B100," "Y100," "O100," and "G100." Therefore, the data generation unit 12a references the spot color DB 28 to recognize the value for each of the spot colors "R100," "B100," "Y100," "O100," and "G100," then analyzes the color of each pixel in the target image 40 to learn at what position in the target image 40 to use each of the spot colors "R100," "B100," "Y100," "O100," and "G100." In this example, as a result of step S200, the data generation unit 12a is treated as learning that the star image 40a is depicted with the spot color "G100," the star image 40b is depicted with the spot color "O100," the star image 40c is depicted with the spot color "Y100," the character string 40d is depicted with the spot color "R100," and the rectangular image 40e is depicted with the spot color "B100." Note that in FIG. 8, as well as FIG. 9, FIG. 11A, FIG. 11B, and FIG. 12 below, portions with different colors are expressed by a difference in pattern.

In step S210, the data generation unit 12a determines a position of the spot color patch on the basis of the position of the spot color contained in the target image. A transport stop mark 41f and a colorimetry start bar 41g are disposed along the second direction D2 at prescribed positions in the color chart base data 41. In addition, with the colorimetry start bar 41g as a starting point, patch positions 41a, 41b, 41c, 41d, and 41e are assured in advance at equal intervals along the second direction D2 in the color chart base data 41. The patch positions 41a, 41b, 41c, 41d, and 41e are rectangular areas for disposing the spot color patches.

Given this, the data generation unit 12a follows the priority order of the spot colors specified in the spot color DB 28 and determines that the position of each spot color patch for the spot colors "R100," "B100," "Y100," "O100," and "G100" is one of the patch positions 41a, 41b, 41c, 41d, and 41e. When the data generation unit 12a determines the position of the spot color patch for one of the spot colors, the data generation unit 12a determines that the patch position corresponding to a greater amount of the spot color, from among the patch positions 41a, 41b, 41c, 41d, and 41e, is the position of the spot color.

Step S210 will be described in greater detail.

Within the target image 40, patch corresponding regions 401, 402, 403, 404, and 405 having positions in the second direction D2 that correspond one-to-one with the patch positions 41a, 41b, 41c, 41d, and 41e are depicted with a dashed line. The size of the patch corresponding regions 401, 402, 403, 404, and 405 in the first direction D1 is equal to the size of the target image 40 in the first direction D1.

The data generation unit 12a first finds the size of the surface area in each of the patch corresponding regions 401, 402, 403, 404, and 405 for the spot color "R100," which has the highest priority order among the spot colors contained in the target image 40. According to the position of the character string 40d formed by the spot color "R100" found in step S200, the patch corresponding region 404 among the patch corresponding regions 401, 402, 403, 404, and 405 overlaps with the character string 40d. In other words, the patch corresponding region 404 contains the most of the spot color "R100." Given this, the data generation unit 12a determines that the patch position 41d that corresponds to the patch corresponding region 404 is the position of the spot color patch for the spot color "R100."

Next, the data generation unit 12a finds the size of the surface area in each of the patch corresponding regions 401, 402, 403, and 405, omitting the patch corresponding region 404, for the spot color "B100," which has the next-highest priority order after the spot color "R100" among the spot colors contained in the target image 40. According to the position of the rectangular image 40e formed by the spot color "B100," the patch corresponding regions 402, 403, and 405 among the patch corresponding regions 401, 402, 403, and 405 overlap with the rectangular image 40e. Furthermore, of these, the surface area of the spot color "B100" within the patch corresponding region 402 is the smallest, and the surface area of the spot color "B100" within the patch corresponding region 403 is equal to the surface area of the spot color "B100" within the patch corresponding region 405. In such a case, the data generation unit 12a may designate either of the patch position 41c corresponding to the patch corresponding region 403 or the patch position 41e corresponding to the patch corresponding region 405 as the position of the spot color patch for the spot color "B100," but herein, the data generation unit 12a determines that the patch position 41c, which is closer to the colorimetry start bar 41g in the second direction D2, is the position of the spot color patch for the spot color "B100."

Next, the data generation unit 12a finds the size of the surface area in each of the patch corresponding regions 401, 402, and 405, omitting the patch corresponding regions 403 and 404, for the spot color "Y100," which has the next-highest priority order after the spot color "B100" among the spot colors contained in the target image 40. According to the position of the star image 40c formed by the spot color "Y100," the patch corresponding regions 401 and 402 among the patch corresponding regions 401, 402, and 405 overlap with the star image 40c. In addition, the surface area of the spot color "Y100" within the patch corresponding region 402 is larger than the surface area of the spot color "Y100" within the patch corresponding region 401. Thus, the data generation unit 12a determines that the patch position 41b that corresponds to the patch corresponding region 402 is the position of the spot color patch for the spot color "Y100."

Next, the data generation unit 12a finds the size of the surface area in each of the patch corresponding regions 401 and 405, omitting the patch corresponding regions 402, 403, and 404, for the spot color "O100," which has the next-highest priority order after the spot color "Y100" among the spot colors contained in the target image 40. According to the position of the star image 40b formed by the spot color "O100," the patch corresponding region 401 among the patch corresponding regions 401 and 405 overlaps with the star image 40b. Thus, the data generation unit 12a determines that the patch position 41a that corresponds to the patch corresponding region 401 is the position of the spot color patch for the spot color "O100." With respect to the spot color "G100" contained in the target image 40, the patch position 41a that corresponds to the patch corresponding region 401 containing the most of the spot color "G100" has already been decided to be the spot color "O100," and therefore the data generation unit 12a determines that the remaining patch position 41e is the position of the spot color patch for the spot color "G100."

In step S220, the data generation unit 12a generates color chart data where the spot colors are arranged into the positions decided in step S210. In other words, with reference to the example in FIG. 8, the data generation unit 12a generates the color chart data 42 by disposing the spot color patch 420 for the spot color "O100" at the patch position 41a of the color chart base data 41, disposing the spot color patch 42Y for the spot color "Y100" at the patch position 41b, disposing the spot color patch 42B for the spot color "B100" at the patch position 41c, disposing the spot color patch 42R for the spot color "R100" at the patch position 41d, and disposing the spot color patch 42G for the spot color "G100" at the patch position 41e. The transport stop mark 41f and the colorimetry start bar 41g in the color chart base data 41 are left unmodified in the color chart data 42.

The spot color patch 420 is a region formed by clustering a plurality of pixels having the ink quantity (CMYK value) for the spot color "O100" acquired in step S120. Similarly, the spot color patch 42Y is a region formed by assembling a plurality of pixels having the ink quantity for the spot color "Y100" acquired in step S120, and the spot color patch 42B is a region formed by assembling a plurality of pixels having the ink quantity for the spot color "B100" acquired in step S120. The spot color patch 42R is a region formed by assembling a plurality of pixels having the ink quantity for the spot color "R100" acquired in step S120, and the spot color patch 42G is a region formed by assembling a plurality of pixels having the ink quantity for the spot color "G100" acquired in step S120.

One of the spot colors is designated as a "first spot color." According to the first embodiment, the data generation unit 12a acquires, from the first image represented by the first print job, a position of the first spot color contained in the first image and generates color chart data having a first spot color patch that is a patch of the first spot color disposed at a position corresponding to the position of the first spot color in the first image. According to the example in FIG. 8, it may be said that at least the spot colors "O100," "Y100," "B100," and "R100" each have a spot color patch disposed at a position within the color chart data that corresponds to the position of the spot color in the target image 40.

A spot color with a lower priority order than the first spot color is designated as a "second spot color." For example, when the spot color "R100" has been designated as the first spot color, the second spot color corresponds to one of the spot colors "B100," "Y100," "O100," and "G100." According to the first embodiment, the data generation unit 12a acquires, from the first image, a position of the first spot color and a position of the second spot color contained in the first image. In addition, the data generation unit 12a generates the color chart data having the first spot color patch disposed as described above and the second spot color patch that is a patch of the second spot color disposed at a position that avoids the first spot color patch and that is decided on the basis of the position of the second spot color in the first image.

The discussion now returns to FIG. 3.

In step S150, the printing colorimetry control unit 12b controls the carriage 17 and the printing head 18 and executes the printing on the printing medium 30 of the color chart based on the color chart data generated in step S140. Step S150 corresponds to "printing" the color chart. The printing colorimetry control unit 12b may execute necessary image processing of the color chart data, such as halftone processing that converts the color chart data to dot on/off information for each CMYK ink for each pixel, and drive the printing head 18 on the basis of the processed color chart data (print data).

Of course, the printing colorimetry control unit 12b prints the color chart onto the printing medium 30 with a number of passes of the printing head 18 according to the printing condition acquired in step S100. Also, the printing medium 30 that the transport unit 16 sends below the printing head 18, that is, the printing medium 30 on which the color chart is printed, is assumed to be the type of printing medium indicated in the printing condition acquired in step S100. As a result of step S150, the color chart is printed with the transport stop mark 41f, the colorimetry start bar 41g, and the spot color patches 420, 42Y, 42B, 42R, and 42G arranged as illustrated in the color chart data 42 of FIG. 8, for example.

In step S160, the printing colorimetry control unit 12b controls the transport unit 16 and the colorimetry unit 19 and executes colorimetry of the color chart printed on the printing medium 30 in step S150. Step S160 corresponds to "measuring the color" of the color chart. In step S160, the printing colorimetry control unit 12b first causes the transport unit 16 to transport downstream the printing medium 30 for which the printing from step S150 has ended.

When a detection signal indicating that the transport stop mark 41f has been detected is input through a prescribed sensor, the printing colorimetry control unit 12b stops transport of the printing medium 30 by the transport unit 16. Although not illustrated in the drawings, the printing apparatus 10 includes the sensor that detects the transport stop mark 41f printed on the printing medium 30 at a prescribed position near the colorimetry unit 19. Therefore, when the transport stop mark 41f is detected by the sensor, the printing colorimetry control unit 12b stops transport of the printing medium 30 by the transport unit 16. When transport of the printing medium 30 is stopped in this way, the positions of the colorimetry unit 19 and the spot color patches printed on the printing medium 30 match or nearly match in the first direction D1.

Next, the printing colorimetry control unit 12b initiates movement in the second direction D2 for the colorimetry unit 19 that is at a prescribed initial position. Once the colorimetry unit 19 that has begun moving from the initial position measures the color of the colorimetry start bar 41g printed on the printing medium 30, the colorimetry unit 19 performs colorimetry at predetermined, fixed intervals while moving in the second direction D2. Accordingly, the colorimetry unit 19 measures the color of each of the spot color patches printed at equal intervals along the second direction D2 on the printing medium 30, in alignment order. With reference to the example of FIG. 8, the colorimetry unit 19 measures the color of each spot color patch in the order of spot color patches 42O, 42Y, 42B, 42R, and 42G. The colorimetry unit 19 outputs a colorimetry value for each spot color patch to the control unit 11.

The printing colorimetry processing of the color chart runs up to step S160, but the control unit 11 can execute an evaluation and adjustment process (step S170) on the spot colors on the basis of the colorimetry values for the spot color patches obtained from step S160 and end the flowchart of FIG. 3. The evaluation and adjustment process is a process for evaluating a color difference between the colorimetry value of the spot color patch and an ideal value, and adjusting the ink quantity for the spot color as needed, notifying the user of the color difference, or the like. Of course, the term "ideal value" here refers to a tint value for each spot color specified in the spot color DB 28.

In step S170, the control unit 11, for example, calculates the color difference between the colorimetry value of the spot color patch 42R and the tint value of the spot color "R100" specified in the spot color DB 28. In addition, the control unit 11 calculates a correction value for bringing the color difference closer to 0 for the CMYK value of the spot color "R100" that is detailed in the ink quantity table 29 and corrects the CMYK value of the spot color "R100" detailed in the ink quantity table 29 using this correction value.

Thereafter, when printing the target image 40 in accordance with the printing condition that corresponds to the ink quantity table 29, the control unit 11 prints the character string 40d using the corrected CMYK value for the spot color "R100" in the ink quantity table 29. Accordingly, the character string 40d can be recreated on the printing medium 30 with the ideal color.

Also, in step S170, the control unit 11, for example, calculates the color difference between the colorimetry value of the spot color patch 42R and the tint value of the spot color "R100" specified in the spot color DB 28. In addition, the control unit 11 may display the color difference on the display unit 13, may display a notification that color reproduction accuracy of the spot color is low when the color difference exceeds a prescribed threshold value, or the like.

In the present embodiment, a color chart is printed having a spot color patch disposed at a position corresponding to the position of the spot color in a target image. According to the evaluation and adjustment process using the colorimetry value of the spot color patch printed in this way, a spot color to be printed as part of a target image can be accurately evaluated.

2-2. Second Embodiment

Printing colorimetry processing of a color chart according to a second embodiment is described, similarly to the first embodiment, in accordance with the flowcharts of FIG. 3 and FIG. 7. However, descriptions that are shared with the first embodiment are omitted in each of the embodiments that follow, including the second embodiment.

In step S130, the data generation unit 12a acquires a plurality of print jobs. One of the print jobs acquired in step S130 is referred to as the "first print job," and one print job other than the first print job from among the plurality of print jobs is referred to as a "second print job." The target image represented by the second print job corresponds to a "second image." In step S140, the data generation unit 12a generates color chart data on the basis of the plurality of print jobs acquired in step S130.

Figure 9:
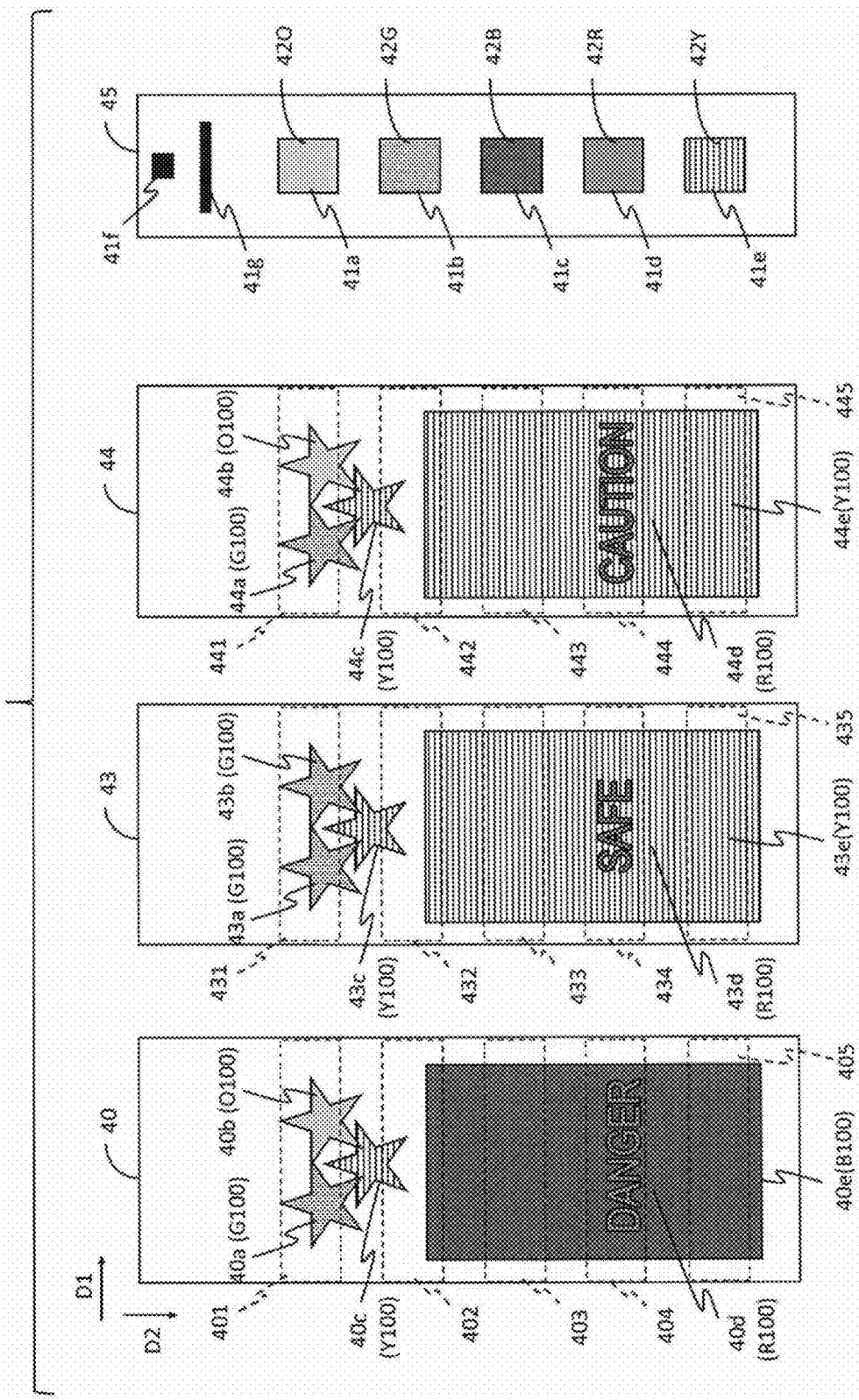
FIG. 9 is a diagram describing a specific example of steps S200 to S220 in a second embodiment.

FIG. 9 is a diagram describing a specific example of steps S200 to S220 in the second embodiment. FIG. 9 can be read in the same way as FIG. 8. In FIG. 9, the target image 40 represented by the first print job, a target image 43 represented by the second print job, a target image 44 represented by a third print job, and a color chart 45 generated in step S220 are depicted in a row. In FIG. 9, a depiction of the color chart base data 41 that serves as the basis for generating the color chart data 45 is omitted. The target image 40 is an example of the first image, and adheres to the description referencing FIG. 8. The target image 43 is referred to as a second image and the target image 44 is referred to as a third image.

In other words, FIG. 9 illustrates a specific example of step S140 (S200 to S220) that is executed when three print jobs are acquired in accordance with a user instruction in step S130. In the second embodiment, at least two print jobs may be utilized in step S140, and the method for generating the color chart data is the same whether there are two print jobs, or three or more print jobs.

According to FIG. 9, the target image 43 contains three star images 43a, 43b, and 43c, a character string 43d that reads "SAFE," and a rectangular image 43e serving as a background to the character string 43d. According to the second print job, the target image 43 is treated as containing all of the spot colors "R100," "B100," "Y100," "O100," and "G100." Therefore, in step S200, the data generation unit 12a learns at what position in the target image 43 to use each of the spot colors "R100," "B100," "Y100," "O100," and "G100." The data generation unit 12a is treated as learning that the star images 43a and 43b are depicted with the spot color "G100," the star image 43c is depicted with the spot color "Y100," the character string 43d is depicted with the spot color "R100," and the rectangular image 43e is depicted with the spot color "Y100."

The target image 44 contains three star images 44a, 44b, and 44c, a character string 44d that reads "CAUTION," and a rectangular image 44e serving as a background to the character string 44d. According to the third print job, the target image 44 is treated as containing all of the spot colors "R100," "B100," "Y100," "O100," and "G100." Therefore, in step S200, the data generation unit 12a learns at what position in the target image 44 to use each of the spot colors "R100," "B100," "Y100," "O100," and "G100." The data generation unit 12a is treated as learning that the star image 44a is depicted with the spot color "G100," the star image 44b is depicted with the spot color "O100," the star image 44c is depicted with the spot color "Y100," the character string 44d is depicted with the spot color "R100," and the rectangular image 44e is depicted with the spot color "Y100."

Within the target image 43, patch corresponding regions 431, 432, 433, 434, and 435 having positions in the second direction D2 that correspond one-to-one with the patch positions 41a, 41b, 41c, 41d, and 41e are depicted with a dashed line. The size of the patch corresponding regions 431, 432, 433, 434, and 435 in the first direction D1 is equal to the size of the target image 43 in the first direction D1. Similarly, within the target image 44, patch corresponding regions 441, 442, 443, 444, and 445 having positions in the second direction D2 that correspond one-to-one with the patch positions 41a, 41b, 41c, 41d, and 41e are depicted with a dashed line. The size of the patch corresponding regions 441, 442, 443, 444, and 445 in the first direction D1 is equal to the size of the target image 44 in the first direction D1.

FIG. 10 expresses in table form a correspondence relationship between a patch position and the surface area of a spot color contained in a plurality of target images representing a plurality of print jobs acquired in step S130. For example, in FIG. 10, a value "480" that corresponds to the patch position 41d and the spot color "R100" means the total surface area of the spot color "R100" contained in the patch corresponding regions 404, 434, and 444 that correspond to the patch position 41d. The units for the surface area are not particularly restricted and may, for example, be a number of pixels. As understood from FIG. 9, for example, the spot color "R100" is not contained in any of the patch corresponding regions 401, 431, and 441, and therefore in FIG. 10, the surface area for the spot color "R100" corresponding to the patch position 41a is "0." In addition, in FIG. 10, a value "2260" that corresponds to the patch position 41c and the spot color "B100" of course means the total surface area of the spot color "B100" contained in the patch corresponding regions 403, 433, and 443.

In step S210, on the basis of the position of each spot color in the plurality of target images, the data generation unit 12a collects information on these correspondence relationships between the patch positions 41a, 41b, 41c, 41d, and 41e and the surface areas of the spot colors contained in the plurality of target images. In addition, on the basis of the correspondence relationships, the position of each spot color patch is decided to be one of the patch positions 41a, 41b, 41c, 41d, and 41e according to the previously discussed priority order of the spot colors. Note that in the first embodiment, the data generation unit 12a can be said to decide the position of the spot color patch in step S210 on the basis of the correspondence relationship between the patch positions 41a, 41b, 41c, 41d, and 41e and the surface areas of the spot colors contained in one target image (first target image).

According to FIG. 10, of all of the patch positions, the patch position corresponding to the most of the spot color "R100" is the patch position 41d. Therefore, the data generation unit 12a determines that the patch position 41d is the position of the spot color patch for the spot color "R100."

In addition, according to FIG. 10, the patch positions that correspond to the most of the spot color "B100," of the patch positions 41a, 41b, 41c, and 41e, are the patch positions 41c and 41e. Therefore, the data generation unit 12a determines that the patch position 41c that is closer to the colorimetry start bar 41g is the position of the spot color patch for the spot color "B100."

In addition, according to FIG. 10, the patch position that corresponds to the most of the spot color "Y100," of the patch positions 41a, 41b, and 41e, is the patch position 41e. Therefore, the data generation unit 12a determines that the patch position 41e is the position of the spot color patch for the spot color "Y100."

In addition, according to FIG. 10, the patch position that corresponds to the most of the spot color "O100," of the patch positions 41a and 41b, is the patch position 41a.

Therefore, the data generation unit 12a determines that the patch position 41a is the position of the spot color patch for the spot color "O100" and determines that the remaining patch position 41b is the position of the spot color patch for the spot color "G100."

With reference to FIG. 9 and FIG. 10, in step S220, the data generation unit 12a generates the color chart data 45 by disposing the spot color patch 42O for the spot color "O100" at the patch position 41a of the color chart base data 41, disposing the spot color patch 42G for the spot color "G100" at the patch position 41b, disposing the spot color patch 42B for the spot color "B100" at the patch position 41c, disposing the spot color patch 42R for the spot color "R100" at the patch position 41d, and disposing the spot color patch 42Y for the spot color "Y100" at the patch position 41e. Of course, the transport stop mark 41f and the colorimetry start bar 41g in the color chart base data 41 are left unmodified in the color chart data 45.

According to the description up to this point, when the data generation unit 12a determines that the position corresponding to a greater amount of a spot color is the position of the spot color patch on the basis of the position of the spot color in the target image, the data generation unit 12a makes the decision from the viewpoint of the position that corresponds to the surface area for the greater amount of the spot color. However, when the data generation unit 12a determines that the position corresponding to a greater amount of a spot color is the position of the spot color patch on the basis of the position of the spot color in the target image, the data generation unit 12a may also make the decision from the viewpoint of the position where a greater number of target images have the spot color.

Figure 11A:
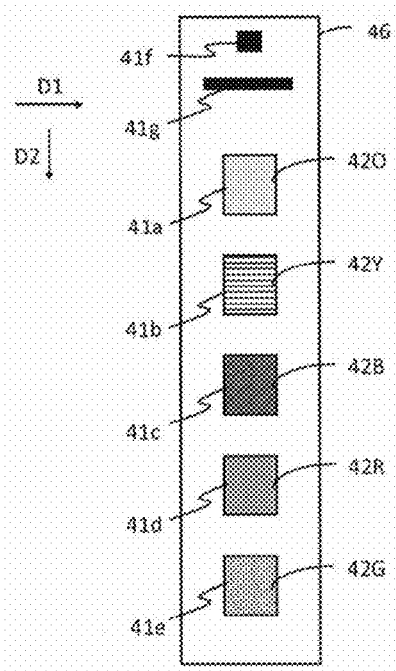
FIG. 11A is a diagram illustrating exemplary color chart data that is generated in the second embodiment.

FIG. 11A illustrates color chart data 46 generated in step S220. The color chart data 46 has each of the spot color patches arranged on the basis of the position of each spot color in the target images 40, 43, and 44 for each of a plurality of print jobs and the previously discussed priority order of the spot colors, and is an example that is different from the color chart data 45 in FIG. 9. The color chart data 46 is generated in step S220 based on the viewpoint of the position where a greater number of target images have the spot color.

According to FIG. 9, the spot color "R100" is contained in the patch corresponding region 404 of the target image 40, the patch corresponding region 434 of the target image 43, and the patch corresponding region 444 of the target image 44. Thus, of all of the patch positions, the patch position 41d corresponds to the position where the most target images have the spot color "R100." Therefore, the data generation unit 12a determines that the patch position 41d is the position of the spot color patch for the spot color "R100."

In addition, according to FIG. 9, the spot color "B100" is contained in the patch corresponding regions 402, 403, 404, and 405 of the target image 40. Therefore, omitting the patch position 41d, the patch positions 41b, 41c, and 41e correspond to the positions where the most target images have the spot color "B100." In this case, the patch positions 41b, 41c, and 41e correspond to a position where one target image has the spot color "B100." Therefore, the data generation unit 12a may take into consideration the size of the surface area of the spot color "B100" and proximity to the colorimetry start bar 41g and decide that the patch position 41c is the position of the spot color patch for the spot color "B100."

Also, according to FIG. 9, the spot color "Y100" is contained in the patch corresponding regions 401 and 402 of the target image 40, the patch corresponding regions 431, 432, 433, 434, and 435 of the target image 43, and the patch corresponding regions 441, 442, 443, 444, and 445 of the target image 44. Therefore, the patch positions 41a and 41b correspond to the positions where the most target images have the spot color "Y100." In this case, the patch positions 41a and 41b both correspond to a position where the three target images have the spot color "Y100." Therefore, the data generation unit 12a may take into consideration the size of the surface area of the spot color "Y100" and decide that the patch position 41b is the position of the spot color patch for the spot color "Y100."

Also, according to FIG. 9, the spot color "O100" is contained in the patch corresponding region 401 of the target image 40 and the patch corresponding region 441 of the target image 44. Accordingly, the patch position 41a corresponds to the position where the most target images have the spot color "O100." Therefore, the data generation unit 12a determines that the patch position 41a is the position of the spot color patch for the spot color "O100" and determines that the remaining patch position 41e is the position of the spot color patch for the spot color "G100."

In accordance with these decisions, the data generation unit 12a generates the color chart data 46 by disposing the spot color patch 420 at the patch position 41a of the color chart base data 41, disposing the spot color patch 42Y at the patch position 41b, disposing the spot color patch 42B at the patch position 41c, disposing the spot color patch 42R at the patch position 41d, and disposing the spot color patch 42G at the patch position 41e. The transport stop mark 41f and the colorimetry start bar 41g in the color chart base data 41 are left unmodified in the color chart data 46.

In this connection, as a result, the color chart data 46 is exactly the same data as the color chart data 42 in FIG. 8.

In the second embodiment, of each of the patch positions, the patch position determined as the position where the spot color patch for the first spot color is disposed may also be referred to as a "first patch position." In addition, of each of the patch positions aside from the first patch position, the patch position determined as the position where the spot color patch for the second spot color is disposed may also be referred to as a "second patch position." For example, when the spot color "B100" is designated as the first spot color and the spot color "Y100" is designated as the second spot color, with respect to the color chart data 45 in FIG. 9, the patch position 41c corresponds to the first patch position and the patch position 41e corresponds to the second position.

2-3. Third Embodiment

Printing colorimetry processing of a color chart according to a third embodiment is described. In the third embodiment, in step S130, the data generation unit 12a may acquire one or a plurality of print jobs. In addition, in the third embodiment, the data generation unit 12a finds the priority order of the spot colors according to the size of the surface area of each spot color in the target image represented by the print job acquired in step S130 and does not reference the spot color priority order that was specified ahead of time in the spot color DB 28.

In this example, it is assumed that, similarly to the second embodiment, the data generation unit 12a acquires the target images 40, 43, and 44 of the first through third print jobs in step S130 and, in step S140, acquires the correspondence relationship between the surface area of a spot color and the patch position illustrated in FIG. 10.

Figure 11B:
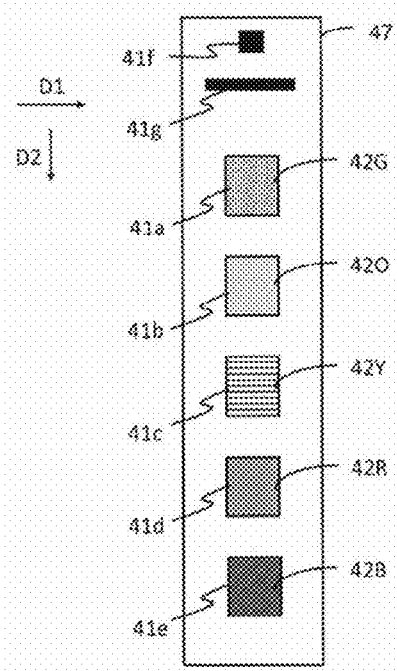
FIG. 11B is a diagram illustrating exemplary color chart data generated in a third embodiment.

FIG. 11B illustrates color chart data 47 generated in step S220 of the third embodiment.

In step S210, the data generation unit 12a finds the maximum value for the surface area corresponding to a patch position for each spot color. According to FIG. 10, the surface area "480" corresponding to the patch position 41d is the maximum value for the spot color "R100." In addition, according to FIG. 10, the surface area "2260" corresponding to the patch position 41c and the surface area "2260" corresponding to the patch position 41e are the maximum values for the spot color "B100." In a similar vein, the surface area "4520" corresponding to the patch position 41c and the surface area "4520" corresponding to the patch position 41e are the maximum values for the spot color "Y100." The surface area "1500" corresponding to the patch position 41a is the maximum value for the spot color "O100." The surface area "3000" corresponding to the patch position 41a is the maximum value for the spot color "G100."

The larger the maximum value for the surface area found in this way for each spot color, the higher the priority order the data generation unit 12a assigns to the spot color. According to the example in FIG. 10, the spot color "Y100" having the surface area "4520" and corresponding to the patch positions 41c and 41e will be the spot color with the highest priority order. In a similar vein, the priority order following the spot color "Y100" is the spot color "G100" with the surface area of "3000," the spot color "B100" with the surface area of "2260," the spot color "O100" with the surface area of "1500," and the spot color "R100" with the surface area of "480."

Following the priority order of the spot colors found in this way, the data generation unit 12a determines that the position of each spot color patch is one of the patch positions 41a, 41b, 41c, 41d, and 41e.

According to FIG. 10, of all of the patch positions, the patch positions corresponding to the most of the spot color "Y100" are the patch positions 41c and 41e. Therefore, the data generation unit 12a determines that the patch position 41c, which is closer to the colorimetry start bar 41g, is the position of the spot color patch for the spot color "Y100."

In addition, according to FIG. 10, the patch position that corresponds to the most of the spot color "G100," of the patch positions 41a, 41b, 41d, and 41e, is the patch position 41a. Therefore, the data generation unit 12a determines that the patch position 41a is the position of the spot color patch for the spot color "G100."

In addition, according to FIG. 10, the patch position that corresponds to the most of the spot color "B100," of the patch positions 41b, 41d, and 41e, is the patch position 41e. Therefore, the data generation unit 12a determines that the patch position 41e is the position of the spot color patch for the spot color "B100."

In addition, according to FIG. 10, the patch position that corresponds to the most of the spot color "O100" is the patch position 41a, but the spot color patch for the spot color "G100" has already been decided to be the patch position 41a. Therefore, the data generation unit 12a determines that the patch position 41b that, of the remaining patch positions 41b and 41d, is closer to the patch position 41a is the position of the spot color patch for the spot color "O100." The data generation unit 12a also determines that the remaining patch position 41d is the position of the spot color patch for the spot color "R100."

Therefore, in step S220, the data generation unit 12a generates the color chart data 47 by disposing the spot color patch 42G at the patch position 41a of the color chart base data 41, disposing the spot color patch 420 at the patch position 41b, disposing the spot color patch 42Y at the patch position 41c, disposing the spot color patch 42R at the patch position 41d, and disposing the spot color patch 42B at the patch position 41e. The transport stop mark 41f and the colorimetry start bar 41g in the color chart base data 41 are left unmodified in the color chart data 47.

In step S130, even when only one print job is acquired, in the third embodiment the data generation unit 12a may find the priority order of the spot colors according to the size of the surface area of each spot color in the target image, as described above. For example, consider a case where only the first print job is acquired in step S130. In such a case, the data generation unit 12a finds the priority order of the spot colors according to the size of the surface area of each spot color in the target image 40. According to FIG. 9, the target image 40 contains a large amount of the spot color "B100" in the patch corresponding areas 403 and 405, and therefore the data generation unit 12a designates the spot color "B100" as the spot color with the highest priority order and determines that the patch position 41c is the patch position for the spot color "B100." The data generation unit 12a may assign a priority order to each of the other spot colors, as well, according to the surface area of each spot color in each of the patch corresponding regions of the target image 40, and may associate each of the other spot colors with a patch position other than the patch position 41c according to the priority order.

According to the third embodiment, among two different spot colors contained in the first image, the data generation unit 12a can be said to designate the spot color with the larger surface area as the first spot color and the spot color with the smaller surface area as the second spot color. In the third embodiment, the priority order of the spot colors is found according to the size of the surface area of each spot color in the target image represented by the print job acquired in step S130, without referencing the spot color priority order that was specified ahead of time in the spot color DB 28, but the third embodiment may also be configured to find the priority order when a number of printed sheets is further increased. Specifically, in a case where there is one printed sheet of the target image 40, one printed sheet of the target image 43, and two printed sheets of the target image 44, when a correspondence relationship between the surface area of a spot color and the patch position such as in FIG. 10 is acquired, the surface area of the spot color for each patch position is doubled for the target image 44 before creating the correspondence relationship between the surface area of the spot color and the patch position. In this case, the spot color surface areas that correspond to the patch position 41a are spot color "R100" with a surface area of "0," spot color "B100" with a surface area of "0," spot color "Y100" with a surface area of "400," spot color "O100" with a surface area of "2250," and spot color "G100" with a surface area of "3750."

2-4. Fourth Embodiment

Printing colorimetry processing of a color chart according to a fourth embodiment will be described. In the fourth embodiment, the data generation unit 12a disposes a spot color patch at an optimal position for each spot color in accordance with the position of the spot color in a target image, without adopting the idea of the plurality of patch positions 41a, 41b, 41c, 41d, and 41e stored in advance in the color chart data, as described up to this point.

Figure 12:
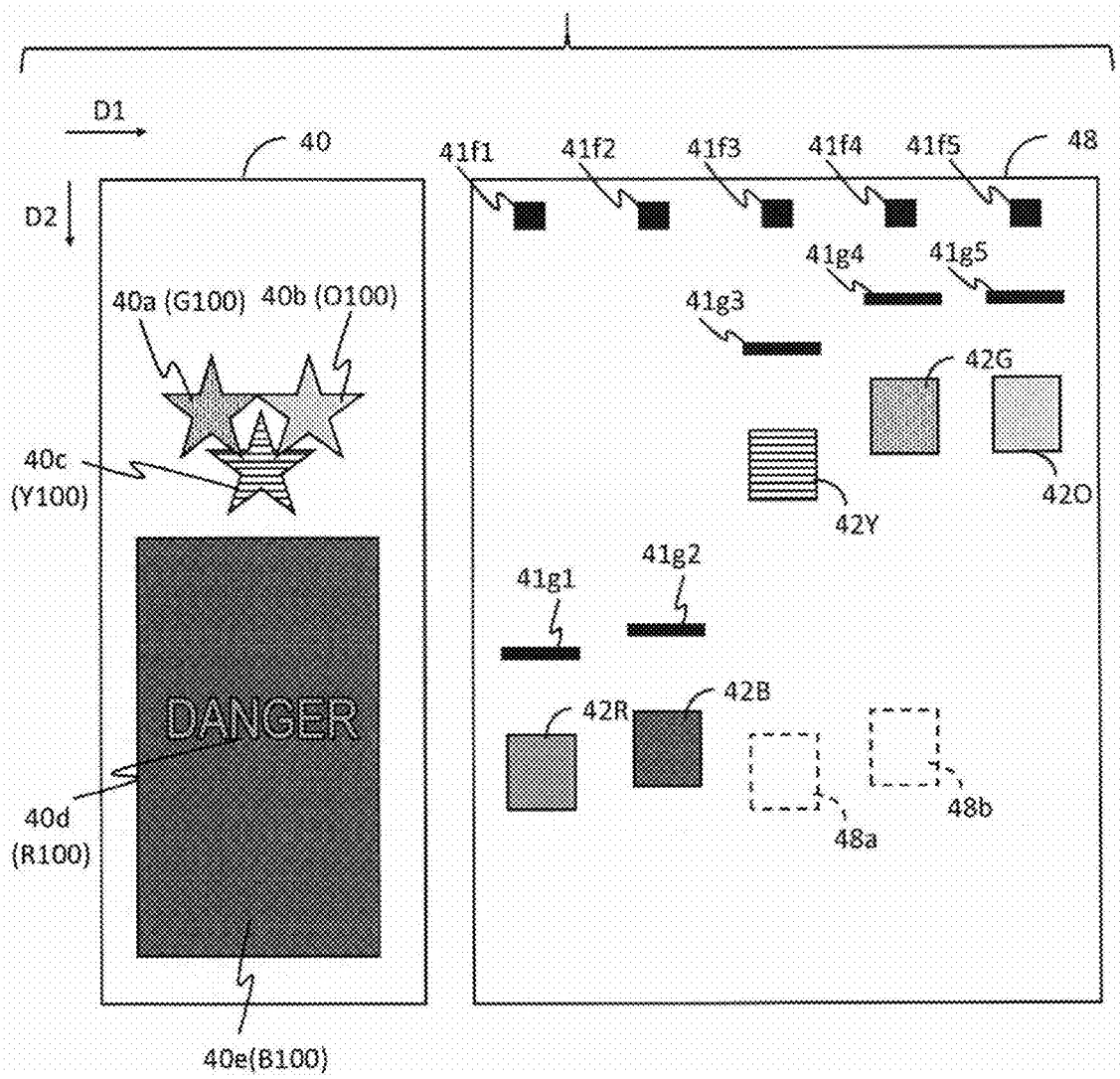
FIG. 12 is a diagram describing a specific example of steps S200 to S220 in a fourth embodiment.

FIG. 12 is a diagram describing a specific example of steps S200 to S220 in the fourth embodiment. FIG. 12 can be read in the same way as FIG. 8 and FIG. 9. In FIG. 12, the target image 40 represented by the first print job acquired in step S130 and a color chart 48 generated in step S220 are depicted in a row. The target image 40 adheres to the description of FIG. 8 and FIG. 9.

In step S210 in the fourth embodiment, the data generation unit 12a determines that the corresponding position in the color chart data 48 for each spot color contained in the target image will be the position of the spot color patch. Of course, the fourth embodiment may also have the position of the spot color patch be decided on the basis of the position of the spot color in a plurality of target images containing the target image 40. According to the example of FIG. 12, the data generation unit 12a determines that the position that corresponds in the second direction D2 to the character string 40d depicted with the spot color "R100" in the target image 40 is the position of the spot color patch 42R. "The position that corresponds in the second direction D2 to the character string 40d" indicates, for example, a position that overlaps with the center point of the character string 40d in the second direction D2. Similarly, the data generation unit 12a determines that the position that corresponds in the second direction D2 to the rectangular image 40e depicted with the spot color "B100" in the target image 40 is the position of the spot color patch 42B. Moreover, the data generation unit 12a determines that the position that corresponds in the second direction D2 to the star image 40c depicted with the spot color "Y100" in the target image 40 is the position of the spot color patch 42Y, the position that corresponds in the second direction D2 to the star image 40b depicted with the spot color "O100" in the target image 40 is the position of the spot color patch 42O, and the position that corresponds in the second direction D2 to the star image 40a depicted with the spot color "G100" in the target image 40 is the position of the spot color patch 42G.

Furthermore, the data generation unit 12a separates the positions of the spot color patches decided in this way for each spot color by moving the positions parallel to the first direction D1 such that the positions do not overlap with each other and establishes the position of the spot color patch for each spot color. In step S220, each spot color patch is disposed at each position established in this way and the color chart data 48 is generated. As a result, as illustrated in FIG. 12, the color chart data 48 is obtained, where each of the five spot color patches 42R, 42B, 42Y, 42O, and 42G are disposed at positions corresponding in the second direction D2 to the position of the spot color in the target image 40, the positions separated from each other in the first direction D1.

In addition, as can be understood from FIG. 12, the color chart data 48 includes a transport stop mark for each spot color patch. Specifically, the color chart data 48 includes a transport stop mark 41f/1 at a position corresponding in the first direction D1 to the spot color patch 42R, a transport stop mark 41f/2 at a position corresponding in the first direction D1 to the spot color patch 42B, a transport stop mark 41f/3 at a position corresponding in the first direction D1 to the spot color patch 42Y, a transport stop mark 41f/4 at a position corresponding in the first direction D1 to the spot color patch 42G, and a transport stop mark 41f/5 at a position corresponding in the first direction D1 to the spot color patch 42O. The role of the transport stop marks 41f/1, 41f/2, 41f/3, 41f/4, and 41f/5 is the same as the role of the transport stop mark 41f described up to this point, but since the position of each spot color patch is different in the first direction D1 in the fourth embodiment, a transport stop mark is needed for each spot color patch.

Similarly, the color chart data 48 includes a colorimetry start bar for each spot color patch. Specifically, the color chart data 48 includes a colorimetry start bar 41g1 at a position corresponding in the first direction D1 to the spot color patch 42R, a colorimetry start bar 41g2 at a position corresponding in the first direction D1 to the spot color patch 42B, a colorimetry start bar 41g3 at a position corresponding in the first direction D1 to the spot color patch 42Y, a colorimetry start bar 41g4 at a position corresponding in the first direction D1 to the spot color patch 42G, and a colorimetry start bar 41g5 at a position corresponding in the first direction D1 to the spot color patch 42O. The role of the colorimetry start bars 41g1, 41g2, 41g3, 41g4, and 41g5 is the same as the role of the colorimetry start bar 41g described up to this point, and there is a fixed distance in the second direction D2 between the spot color patch and the corresponding colorimetry start bar.

For example, the positions in the second direction D2 of the character string 40d and the rectangular image 40e in the target image 40 overlap. Therefore, in the color chart data 48 generated in step S220, the spot color patch 42R that corresponds to the spot color "R100" of the character string 40d and the spot color patch 42B that corresponds to the spot color "B100" of the rectangular image 40e are disposed at positions separated in the first direction D1 and overlapping in the second direction D2. In addition, the positions in the second direction D2 of the star image 40a and the star image 40b overlap. Therefore, in the color chart data 48, the spot color patch 42G that corresponds to the spot color "G100" of the star image 40a and the spot color patch 42O that corresponds to the spot color "O100" of the star image 40b are disposed at positions separated in the first direction D1 and overlapping in the second direction D2. In other words, this means that according to the fourth embodiment, when one spot color is designated as a first spot color and another spot color is designated as a second spot color, in a case where the position of the first spot color and the position of the second spot color in the first image overlap in the second direction D2, color chart data is generated where the first spot color patch and the second spot color patch are disposed at positions separated in the first direction D1 and overlapping in the second direction D2.

In the fourth embodiment, colorimetry of a color chart obtained in step S160 will be described. With reference to FIG. 12, in step S160, the printing colorimetry control unit 12b stops transport of the printing medium 30 by the transport unit 16 at the point when the sensor detects the transport stop mark 41f1 that is printed on the printing medium 30. In addition, the printing colorimetry control unit 12b initiates movement in the second direction D2 for the colorimetry unit 19 that is at the predetermined initial position. Once the colorimetry unit 19 measures the color of the colorimetry start bar 41g1 printed on the printing medium 30, the colorimetry unit 19 performs colorimetry of the spot color patch 42R that occupies a position a fixed distance in the second direction D2 from the colorimetry start bar 41g1. Thereafter, by repeatedly returning to the initial position of the colorimetry unit 19, reinitiating transport of the printing medium 30, stopping transport based on detecting a transport stop mark, initiating movement of the colorimetry unit 19, and measuring the color of a spot color patch using the colorimetry unit 19 once the color of the colorimetry start bar is measured, colorimetry of each spot color patch printed on the printing medium 30 is finished.

Moreover, a modified example of the fourth embodiment will be described. According to the fourth embodiment, when the spot color patch of a spot color contained in the target image is disposed and printed in the color chart data, the spot color patches of all the spot colors contained in the target image can be disposed at an optimal position according to the position of the spot color in the target image. On the other hand, compared to the color chart data 42, 45, 46, and 47 described up to this point, with the color chart data 48, each of the spot color patches are scattered apart from each other in the first direction D1, increasing the length-times-width surface area of the data.

In this example, a spot color other than the first spot color and the second spot color is designated as a third spot color. Then, when the position of the third spot color in the first image does not overlap with either of the position of the first spot color or the position of the second spot color in the second direction D2, the data generation unit 12a may also be configured to generate the color chart data 48 where the third spot color patch that is a patch of the third spot color is disposed at a position separated from the first spot color patch and the second spot color patch in the second direction D2 and overlapping with one of the first spot color patch and the second spot color patch in the first direction D1. Of course, the data generation unit 12a acquires, from the first image, a position of the third spot color in the first image.

According to FIG. 12, the star images 40a, 40b, and 40c are separated from the character string 40d and the rectangular image 40e in the second direction D2. Given this, the data generation unit 12a understands that the spot color "R100" used in the character string 40d is the first spot color, the spot color "B100" used in the rectangular image 40e is the second spot color, and the spot color "G100" used in the star image 40a and the spot color "Y100" used in the star image 40c are the third spot colors. Also, the data generation unit 12a may dispose the spot color patch 42R for the spot color "R100" at a patch position 48a, rather than at the position illustrated in FIG. 12, and dispose the spot color patch 42B for the spot color "B100" at a patch position 48b, rather than at the position illustrated in FIG. 12, to generate the color chart data 48 in step S220.

The patch position 48a is a position corresponding to the character string 40d in the second direction D2 and matching the spot color patch 42Y for the spot color "Y100" in the first direction D1. In addition, the patch position 48b is a position corresponding to the rectangular image 40e in the second direction D2 and matching the spot color patch 42G for the spot color "G100" in the first direction D1. As a result, the color chart data 48 is generated having the third spot color patch disposed at a position separated from the first spot color patch and the second spot color patch in the second direction D2 and overlapping with one of the first spot color patch and the second spot color patch in the first direction D1.

3. Conclusion

In this way, according to the embodiments, the printing apparatus 10 includes the printing unit 31 configured to perform printing by attaching a color material to the printing medium 30, the colorimetry unit 19 configured to measure a color, the data generation unit 12a configured to generate color chart data for printing a color chart that includes the first spot color patch that is a patch of the first spot color, and a printing colorimetry control unit 12b configured to control printing performed by the printing unit 31 and colorimetry performed by the colorimetry unit 19. Also, the data generation unit 12a acquires, from the first image represented by the first print job, a position of the first spot color contained in the first image and generates color chart data having the first spot color patch disposed at a position corresponding to the position of the first spot color in the first image, and the printing colorimetry control unit 12b causes the printing unit 31 to print the color chart that is based on the color chart data and causes the colorimetry unit 19 to measure the color of the color chart printed on the printing medium 30 by the printing unit 31.

According to this configuration, the color chart has the first spot color patch disposed at a position corresponding to the position of the first spot color contained in the first image represented by the first print job, and this color chart is printed on the printing medium 30. Therefore, by measuring the color of the first spot color patch of the printed color chart, the tint value of the first spot color can be captured with a high degree of accuracy and evaluated even in reproduction when printed on the printing medium 30.

In other words, when the sub scanning and the pass of the printing head 18 are combined and the image is printed, the drying time of the ink and the nozzle used differ according to the position in the printing medium 30, and therefore the tint value of the spot color in the printing result differs depending on the position where the spot color is printed. Even under such circumstances, when the embodiments are adopted, the tint value of a spot color when a target image is printed can be captured with a high degree of accuracy from the colorimetry results of the spot color patch.

In addition, according to the embodiments, the data generation unit 12a acquires, from the first image, a position of the second spot color contained in the first image. In addition, the data generation unit 12a generates the color chart data where the first spot color patch is disposed and the second spot color patch that is a patch of the second spot color is disposed at a position that avoids the first spot color patch and that is a position determined on the basis of the position of the second spot color in the first image.

According to this configuration, the data generation unit 12a can generate color chart data in which each spot color patch corresponding to each of the plurality of spot colors contained in the target image is disposed appropriately on the basis of the position of each spot color in the target image while giving the first spot color higher priority than the second spot color.

According to the embodiments, the data generation unit 12a acquires, from the second image, a position of the first spot color and a position of the second spot color contained in the second image represented by the second print job. In addition, the data generation unit 12a generates color chart data having the first spot color patch disposed at a position determined on the basis of the position of the first spot color in the first image and the position of the first spot color in the second image, and the second spot color patch disposed at a position that avoids the first spot color patch and that is a position determined on the basis of the position of the second spot color in the first image and the position of the second spot color in the second image.

According to this configuration, the data generation unit 12a can generate color chart data in which each spot color patch is disposed appropriately on the basis of the position of each spot color in the plurality of target images while giving the first spot color higher priority than the second spot color.

In addition, according to the embodiments, the data generation unit 12a determines the first patch position corresponding to a greater amount of the first spot color, from among the plurality of patch positions predetermined as positions for disposing a patch in the color chart, on the basis of the position of the first spot color in the first image and the position of the first spot color in the second image, and determines the second patch position corresponding to a greater amount of the second spot color, from among the plurality of patch positions except the first patch position, on the basis of the position of the second spot color in the first image and the position of the second spot color in the second image. In addition, the data generation unit 12a generates the color chart data having the first spot color patch disposed at the first patch position and the second spot color patch disposed at the second patch position.

According to this configuration, the data generation unit 12a can decide the position at which to dispose each spot color patch from among the plurality of predetermined patch positions on the basis of the position of each spot color in the plurality of target images while giving the first spot color higher priority than the second spot color.

In addition, according to the embodiments, of two different spot colors contained in the first image, the data generation unit 12a may designate the spot color with the larger surface area as the first spot color and the spot color with the smaller surface area as the second spot color.

According to this configuration, the data generation unit 12a can decide the priority order of the spot colors in accordance with a size relationship of the surface areas of the two spot colors contained in the first image.

Of course, the data generation unit 12a can decide the priority order of the spot colors according to the relative size relationship of the surface areas of a plurality of spot colors in two or more target images that include the first image.

The printing apparatus 10 includes the transport unit 16 transporting the printing medium 30 in the first direction D1. The colorimetry unit 19 is positioned downstream of the printing unit 31 in the first direction D1. With such a configuration, when the position of the first spot color and the position of the second spot color in the first image overlap in the second direction D2 that is orthogonal to the first direction D1, the data generation unit 12a may also be configured to generate color chart data where the first spot color patch and the second spot color patch are disposed at positions separated in the first direction D1 and overlapping in the second direction D2.

According to this configuration, for each of the first spot color and the second spot color, the data generation unit 12a can dispose a spot color patch at an optimal position corresponding to the position of the spot color in the target image, and print the color chart.

Moreover, the data generation unit 12a acquires, from the first image, the position of the third spot color contained in the first image. Then, when the position of the third spot color in the first image does not overlap with either of the position of the first spot color or the position of the second spot color in the second direction D2, the data generation unit 12a may also be configured to generate the color chart data where the third spot color patch that is a patch of the third spot color is disposed at a position separated from the first spot color patch and the second spot color patch in the second direction D2 and overlapping with one of the first spot color patch and the second spot color patch in the first direction D1.

According to this configuration, the data generation unit 12a can dispose a spot color patch at an optimal position corresponding to the position of the spot color in the target image, for each of the first, second, and third spot colors, and print a color chart having the smallest possible overall surface area.

The embodiments also provide disclosures in various categories other than the printing apparatus, such as a system, program, or method.

For example, a printing colorimetry method for a color chart includes a data generation step for generating color chart data for printing a color chart that includes a first spot color patch that is a patch of a first spot color, a printing step, and a colorimetry step. The data generation step includes acquiring, from a first image represented by a first print job, a position of a first spot color contained in the first image and generating color chart data having the first spot color patch disposed at a position corresponding to the position of the first spot color in the first image, the printing step includes causing the printing unit 31 to print on the printing medium 30 the color chart that is based on the color chart data, and the colorimetry step includes causing the colorimetry unit 19 to measure the color of the color chart printed on the printing medium 30 by the printing unit 31.

4. Other Discussion

In the embodiments, an ICC profile is a profile specifying a correspondence relationship between a Lab value and an ink quantity for each of CMYK that is required to achieve the Lab value in a printing result, and the ink quantity for each of CMYK is also referred to as a CMYK value. However, the ICC profile may also be a profile that holds a relationship between a Lab value and a pre-halftone processing CMYK value. In other words, the CMYK value obtained with the ICC profile is not a value that directly indicates the quantity of ink needed for printing, and instead the printing colorimetry control unit 12b may have a configuration that uses a look-up table to convert the CMYK values in the color chart data into CMYK values representing ink quantity, after which the printing colorimetry control unit 12b performs halftone processing. For example, when the printing head 18 is a model that uses six colors of ink, including orange (Or) and green (Gr) inks in addition to CMYK ink, the ink quantities for these six colors are needed. Therefore, the printing colorimetry control unit 12b converts the CMYK values in the color chart data into CMYKOrGr values representing ink quantity using a look-up table.

The primary scanning direction of the carriage 17 and the printing head 18 may be parallel with the second direction D2, rather than parallel with the first direction D1 as illustrated in FIG. 2. In such a case, the sub scanning, which is relative movement of the carriage 17 and the printing medium 30, is realized by transporting the printing medium 30. In other words, the transport unit 16 may transport the printing medium 30 in accordance with a prescribed sub scanning amount between passes that complete one frame of printing. In such a case, the data generation unit 12a may generate and have the printing unit 31 print color chart data where the position of a spot color patch in the first direction D1 is decided and disposed in accordance with the position of a spot color in the target image in the first direction D1.

The printing medium 30 is not limited to a long medium such as roll paper, and may also be cut-sheet paper that is pre-cut into page units, and the like.

Aside from adopting the inkjet method, the printing unit 31 may adopt an electrophotographic method, for example, and may be a mechanism that prints using a toner that is a color material.

What is claimed is:

1. A printing apparatus comprising:
    a printing unit configured to perform printing by attaching a color material to a printing medium;
    a colorimetry unit configured to measure a color;
    a data generation unit configured to generate color chart data for printing a color chart that includes a first spot color patch that is a patch of a first spot color; and
    a printing colorimetry control unit configured to control printing performed by the printing unit and colorimetry performed by the colorimetry unit; wherein
    the data generation unit acquires, from a first image represented by a first print job, a position of the first spot color contained in the first image and generates the color chart data having the first spot color patch disposed at a position corresponding to a position of the first spot color in the first image and
    the printing colorimetry control unit causes the printing unit to print the color chart that is based on the color chart data and causes the colorimetry unit to measure the color of the color chart printed on the printing medium by the printing unit.

2. The printing apparatus according to claim 1, wherein the data generation unit acquires, from the first image, a position of a second spot color contained in the first image and
    generates the color chart data where the first spot color patch is disposed and the second spot color patch that is a patch of the second spot color is disposed at a position that avoids the first spot color patch and that is a position determined on the basis of the position of the second spot color in the first image.

3. The printing apparatus according to claim 2, wherein the data generation unit acquires, from a second image represented by a second print job, a position of the first spot color and a position of the second spot color contained in the second image and
    generates the color chart data having the first spot color patch disposed at a position determined on the basis of the position of the first spot color in the first image and the position of the first spot color in the second image, and the second spot color patch disposed at a position that avoids the first spot color patch and is a position determined on the basis of the position of the second spot color in the first image and the position of the second spot color in the second image.

4. The printing apparatus according to claim 3, wherein the data generation unit determines a first patch position corresponding to a greater amount of the first spot color, from among a plurality of patch positions predetermined as positions for disposing a patch in the color chart, on the basis of the position of the first spot color in the first image and the position of the first spot color in the second image, and determines a second patch position corresponding to a greater amount of the second spot color, from among the plurality of patch positions except the first patch position, on the basis of the position of the second spot color in the first image and the position of the second spot color in the second image and
    generates the color chart data having the first spot color patch disposed at the first patch position and the second spot color patch disposed at the second patch position.

5. The printing apparatus according to claim 2 wherein, among two different spot colors contained in the first image, the data generation unit designates a spot color with a larger surface area as the first spot color and a spot color with a smaller surface area as the second spot color.

6. The printing apparatus according to claim 2, comprising:
   a transport unit configured to transport the printing medium in a first direction; wherein
   the colorimetry unit is positioned downstream of the printing unit in the first direction and
   when the position of the first spot color and the position of the second spot color in the first image overlap in a second direction that is orthogonal to the first direction, the data generation unit generates the color chart data where the first spot color patch and the second spot color patch are disposed at positions separated in the first direction and overlapping in the second direction.

7. The printing apparatus according to claim 6, wherein the data generation unit acquires, from the first image, a position of a third spot color contained in the first image and
   when the position of the third spot color in the first image does not overlap with either of the position of the first spot color or the position of the second spot color in the second direction, the data generation unit generates the color chart data where a third spot color patch that is a patch of the third spot color is disposed at a position separated from the first spot color patch and the second spot color patch in the second direction and overlapping with one of the first spot color patch and the second spot color patch in the first direction.

8. A color chart printing colorimetry method comprising:
   a data generation step for generating color chart data for printing a color chart that includes a first spot color patch that is a patch of a first spot color;
   a printing step; and
   a colorimetry step; wherein
   the data generation step includes acquiring, from a first image represented by a first print job, a position of the first spot color contained in the first image and generating the color chart data having the first spot color patch disposed at a position corresponding to a position of the first spot color in the first image,
   the printing step includes causing a printing unit to print on a printing medium the color chart that is based on the color chart data, and
   the colorimetry step includes causing a colorimetry unit to measure the color of the color chart printed on the printing medium by the printing unit.

* * * * *